United States Patent
Hughes

(10) Patent No.: US 11,088,975 B2
(45) Date of Patent: Aug. 10, 2021

(54) SYSTEMS AND METHODS FOR COORDINATING REAL-TIME MESSAGING FOR DATA SHARING AND UPDATING BETWEEN PARTICIPANTS USING DISPARATE MESSAGE DATA FORMATS

(71) Applicant: AON GLOBAL OPERATIONS SE, SINGAPORE BRANCH, Singapore (SG)

(72) Inventor: Troy Hughes, Saint Paul, MN (US)

(73) Assignee: AON GLOBAL OPERATIONS SE, SINGAPORE BRANCH, Singapore (SG)

( * ) Notice: Subject to any disclaimer, the term of this patent is extended or adjusted under 35 U.S.C. 154(b) by 236 days.

(21) Appl. No.: 16/054,537

(22) Filed: Aug. 3, 2018

(65) Prior Publication Data
US 2019/0044899 A1 Feb. 7, 2019

Related U.S. Application Data

(60) Provisional application No. 62/540,842, filed on Aug. 3, 2017.

(51) Int. Cl.
*H04L 12/58* (2006.01)
*G06Q 40/08* (2012.01)
*G06F 9/54* (2006.01)

(52) U.S. Cl.
CPC ........... *H04L 51/066* (2013.01); *G06F 9/546* (2013.01); *G06Q 40/08* (2013.01); *H04L 51/04* (2013.01); *H04L 51/26* (2013.01); *H04L 51/34* (2013.01)

(58) Field of Classification Search
CPC ......... H04L 51/26; H04L 51/04; H04L 51/34; H04L 51/066; G06F 9/546; G06Q 40/08
See application file for complete search history.

(56) References Cited

U.S. PATENT DOCUMENTS 6,308,120 B1 * 10/2001 Good ................. G08G 1/20
340/438
7,903,796 B1   3/2011 Kheradpir et al.
(Continued)

FOREIGN PATENT DOCUMENTS

EP     3662620     6/2020
WO     2019028415  2/2019

OTHER PUBLICATIONS

International Search Report and Written Opinion issued in International Application No. PCT/US2018/045253, dated Sep. 28, 2018.
(Continued)

*Primary Examiner* — Shean Tokuta
*Assistant Examiner* — Juan C Turriate Gastulo
(74) *Attorney, Agent, or Firm* — Gardella Grace P.A.

(57) ABSTRACT

In an illustrative embodiment, systems and methods for coordinating automated, real-time data sharing and updating between participants using disparate data formats for information transfer include a messaging interface for receiving message initiation requests including messaging data from regionally-distributed computing devices. The message initiation requests may be queued as queuing data in a global message queue. Updates may be made to the queuing data indicating a status of the message initiation requests based on reply messages received from message recipients. A message transmission system may transform the messaging data into a generic data object that is agnostic to messaging formats of a sending computing system and a receiving computing system. The generic data object may be mapped to a message format associated with the receiving computing system. Formatted messages may be transmitted to the receiving computing system responsive to selection of a message initiation request from the global message queue.

20 Claims, 12 Drawing Sheets

(56) References Cited

U.S. PATENT DOCUMENTS

| | | |
|---|---|---|
| 9,940,678 B2 | 4/2018 | Propati et al. |
| 10,360,637 B2 | 7/2019 | Propati et al. |
| 2002/0082875 A1 | 6/2002 | Best-Devereux |
| 2003/0125022 A1* | 7/2003 | Blossom ............ H04L 61/1576 455/426.1 |
| 2004/0143464 A1 | 7/2004 | Houle et al. |
| 2004/0193722 A1 | 9/2004 | Donovan |
| 2005/0080720 A1 | 4/2005 | Betz et al. |
| 2006/0209868 A1* | 9/2006 | Callaghan ............... G06Q 10/00 370/428 |
| 2012/0156985 A1* | 6/2012 | Li ...................... H04L 47/2441 455/8 |
| 2013/0013920 A1 | 1/2013 | Dixon |
| 2015/0254780 A1 | 9/2015 | Propati et al. |
| 2017/0103078 A1* | 4/2017 | Greenblatt ............ G06F 40/221 |
| 2018/0089598 A1* | 3/2018 | Sedlarevic ........... G06Q 20/351 |
| 2018/0144407 A1* | 5/2018 | Pajor ..................... G06Q 40/08 |
| 2018/0285976 A1* | 10/2018 | Dye ....................... G06Q 40/08 |
| 2018/0287904 A1* | 10/2018 | Brummel ................ H04L 67/10 |
| 2018/0315128 A1 | 11/2018 | Propati et al. |
| 2018/0375805 A1* | 12/2018 | Sethi ..................... G06F 16/437 |
| 2020/0143476 A1* | 5/2020 | Sandhu .................. H04L 67/40 |
| 2020/0175604 A1 | 6/2020 | Propati et al. |

OTHER PUBLICATIONS

International Preliminary Report on Patentability issued in International Application No. PCT/US2018/045253 dated Feb. 4, 2020.
Birnbaum, Overview of Lender-Place Insurance Products, Markets, and Issues, Lender-Placed Insurance Regulatory Working Group Outreach Session, Jun. 13, 2013, web edition, 2013, pp. 1-35, Birny Birnbaum Consulting, Inc.

* cited by examiner

| Outgoing Message Queue ID | 202 |
| Date Time Stamp | 204 |
| Unique Identifier | 206 |
| Last Updated By | 208 |
| Receiving Partner | 210 |
| Message Status | 212 |
| Envelope Number | 214 |
| Message Number | 216 |
| Message Sent Date | 218 |
| Message Format ID | 220 |
| Reported Flag | 222 |
| Date Added | 224 |
| Message Queue ID | 226 |

FIG. 3

| | |
|---|---|
| Invoice ID | 302 |
| Outgoing Message Queue ID | 304 |
| Reinsurer ID | 306 |
| Transaction ID | 308 |
| Account Items In Settlement Group Total | 310 |
| Account Period End Date | 312 |
| Account Period Start Date | 314 |
| Account Reference Currency | 316 |
| Account Transaction Date | 318 |
| Account Transaction Description | 320 |
| Adjustment Premium Due By Sender Receiver | 322 |
| Adjustment Premium Due To Sender Receiver | 324 |
| Adjustment Sliding Share Amount | 326 |
| Balance Due Amount | 328 |
| Broker Account Transaction | 330 |
| Brokerage Percentage | 332 |
| Brokerage Receiver Share Amount | 334 |
| Broker Contact Information | 336 |
| Cash Loss Advance Amount | 338 |
| Cash Loss Refund Amount | 340 |
| Commission Percentage | 342 |
| Contract Name | 344 |
| Contract Period End Date And Time | 346 |
| Contract Period Start Date And Time | 348 |
| Current Payment Expenses For The Contract Receiver | 350 |
| Current Payment Losses And Expenses For Contract Receiver | 352 |
| Date Time Stamp | 354 |

SYSTEMS AND METHODS FOR COORDINATING REAL-TIME MESSAGING FOR DATA SHARING AND UPDATING BETWEEN PARTICIPANTS USING DISPARATE MESSAGE DATA FORMATS

RELATED APPLICATIONS

This application claims priority to U.S. Provisional Patent Application Ser. No. 62/540,842, entitled "System and Methods for Coordinating Real-Time Messaging for Data Sharing and Updating between Participants using Disparate Message Data Storage Formats," filed Aug. 3, 2017, which is hereby incorporated by reference in its entirety. This application is related to and also incorporates by reference, in its entirety, the following prior patent application: U.S. patent application Ser. No. 14/638,789, entitled "Automated Systems and Methods for Managing the Placement Process for Securing Insurance Coverage," filed Mar. 4, 2015.

BACKGROUND

When messages are exchanged between participants that internally communicate and process data in data formats that are not compatible with data formats of other participants, messages to be sent to other industry participants may be held in an internal queue by backend messaging applications for a predetermined amount of time (e.g., a day or a predetermined number of hours) and then processed in batches to transform the data into a messaging format that is compatible with a data format for the message recipient. Because multiple industry participants can each use a different messaging and data formats than each of the other participants, converting messages and associated messaging data to formats that are compatible with a particular message recipient can be complex and computationally burdensome, which can cause delays in message transmission. Further, due to the batch processing, messages are not transmitted in real time to their recipients, which degrades overall efficiency of the messaging system. In addition, the backend messaging applications for each of the internal computing systems may include an additional forced messaging layer, which adds an extra layer of processing for the internal computing systems to recognize the data that needs to be transformed into a messaging format compatible with the participant receiving the message.

SUMMARY OF ILLUSTRATIVE EMBODIMENTS

The forgoing general description of the illustrative implementations and the following detailed description thereof are merely exemplary aspects of the teachings of this disclosure, and are not restrictive.

In certain embodiments, systems and methods for coordinating automated, real-time exchange of messages between of computing systems of participants in insurance transactions. A messaging interface may receive message initiation requests including transaction data associated with the insurance transactions from regionally-distributed computing devices. Queuing data for the transactions may be stored in a global message queue. Updates may be made to the queuing data indicating a status of the message initiation requests based on reply messages received from message recipients. A message transmission system may transform the transaction data for the message initiation requests into a generic data object that is agnostic to messaging formats of sending computing system and a receiving computing system. The generic data object may be mapped to a message format associated with the receiving computing system. Messages in the message format may be transmitted to the receiving computing system in response to the queuing data for the transaction being selected for transmission.

Benefits of the embodiments described herein may include real-time transmission of messages to message recipients for messages that are maintained in the global message queue due to various processing efficiencies that occur from a reduced amount of data that is maintained in the global message queue. In addition, transforming the transaction data for a message into a generic data object provides for flexibility and adaptability of the data with a greater amount of processing efficiency, which allows participants that use different messaging formats to seamlessly communicate with one another in real-time. The real-time messaging system described further herein also provides for asynchronous automation of message transmission, which allows the messages to be sent as they arrive in the message queue without having to be processed in one or more batches throughout the course of a day.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 2 illustrates an exemplary diagram of data fields for queuing data that is stored for a specific transaction;

FIG. 3 illustrates an exemplary diagram of data fields for a predetermined message format;

DETAILED DESCRIPTION OF ILLUSTRATIVE EMBODIMENTS

Figure 1:
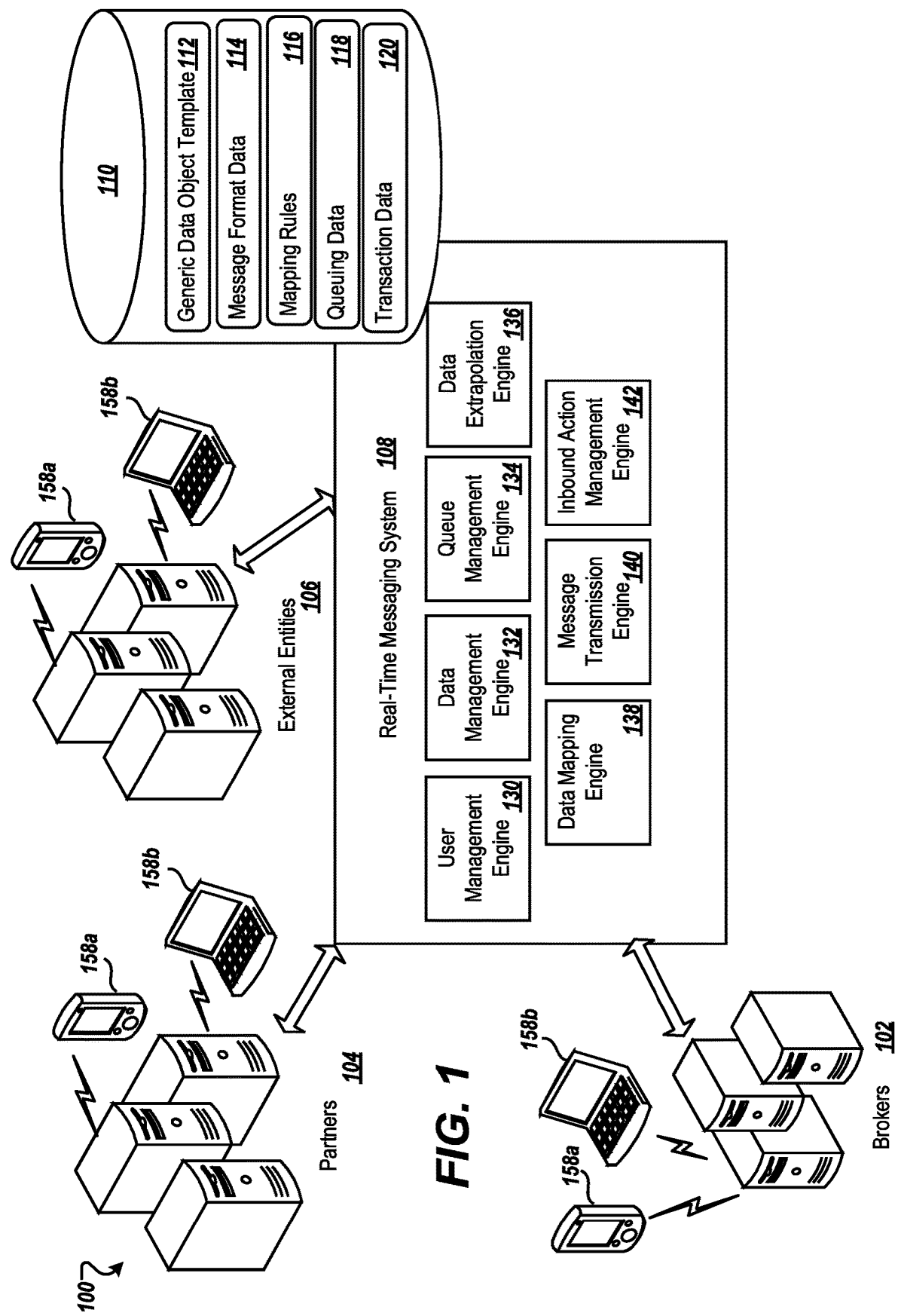
FIG. 1 illustrates a diagram of an example real-time messaging system.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Aspects of the present disclosure may be directed to computing systems and methods that provide for real-time messaging between transaction participants, such as brokers and carriers within the insurance or reinsurance industry. In some implementations, the computing systems described herein may be configured to maintain a real-time global queue of messages for multiple regional queues (e.g., AMERICAS, Europe, the Middle East and Africa (EMEA), Asia-Pacific (APAC)) that are exchanged between the transaction participants, which may include reinsurance transaction invoice messages that are transmitted from global insurance brokers to third-party participants, such as insurance or reinsurance carriers. Messages that are maintained in the global queue may be processed and transmitted in real time to the message recipients. In distributing message processing between regional queues and a global queue, the global queue offers a single point of monitoring for business intelligence information and market intelligence information. The regional queues, meanwhile, offer the opportunity to continue to regionally queue messages in the event of an outage of the system hosting the global queue. The regionally queued messages, for example, may be transferred to the global queue for processing when the global queue is back online. Additionally, in the circumstance of a catastrophic event at the location of the global queue, regional queue locations present the opportunity for graceful failover to a back-up global queueing location. Similarly, as business dynamics may change, the location of the global queue may be migrated without significant disruption to message processing. In an illustrative example, the quantities of data and processing across international wide area networks (WANs) may be reduced by at least 90% through distributing message processing between regional queues and a global queue.

In some examples, an internal computing system for each industry participant may be configured to extrapolate or map transaction data generated for a particular invoice to a generic data object that is agnostic to data formats associated with any of the industry participants, which allows for improved message processing times. In addition, the generic data object for a message can be mapped into a format that is compatible with data formats of the message recipient. Also, because the generic data object is agnostic to data type, updates and revisions may be made to message formats without having to make modifications to the generic data object. Storing the transaction data for a message as a generic data object reduces the number of processing layers needed to convert the message to a format that is compatible with a message recipient because a processing layer that is configured to recognize whether or not a message needs to be transformed to a format compatible with the message recipient is not required. Aspects of the present disclosure are also directed to a message transmission system that operates asynchronously from a messaging interface computing system where users initiate messages to one or more recipients. This asynchronous operation allows messages to be transmitted in real-time without the need for batch processing.

Turning to the figures, FIG. 1 is a diagram of an example environment 100 for a real-time messaging system 108. The diagram illustrates a series of interactions between one or more participants and the real-time messaging system 108, which transmits messages between participants in the real-time messaging environment 100 that indicate that a type of transaction has taken place, is scheduled to take place, or may potentially take place based on a response by one of the participants. In some examples, the participants in the environment 100 may include insurance or reinsurance brokers 102, third-party partners 104, which may include insurance or reinsurance carriers or clients, and other external entities 106, which may include additional sub-systems of the brokers 102 that may have functions other than messaging. In some aspects, the transactions may include requests for insurance or reinsurance quotations, acceptance or rejection of the quotation request, insurance or reinsurance offers, acceptance or rejection of the offers, and/or invoices that are transmitted upon acceptance of the offers.

In one implementation, in response to receiving data associated with a particular transaction from a broker 102, the real-time messaging system 108 adds the transaction to a message queue in preparation for transmitting the transaction data as a message to an associated partner 104. In some examples, the message queue may be a regional queue for a particular geographical region (e.g., AMERICAS, EMEA, APAC, etc.) or a global queue that includes transaction data for all geographical regions. In some implementations, the transaction data in each of the regional queues is forwarded to the global queue, which may function as a central repository for all of the transactions managed by the real-time messaging system 108. The message queue may store only a portion of the data associated with a particular transaction, which improves processing speed of the real-time messaging system 108. For example, the message queue, stored as queuing data 118 in data repository 110 may maintain other transaction data 120 at another portion of the data repository 110. In one example, the queuing data 118 may only include identification information for the messages while the transaction data may include other details associated with the transaction such as the partner 104 receiving the message, message type, supporting documentation for the transaction, and specific transaction or invoice details. In some examples, when data for a transaction is received, the real-time messaging system 108 may execute a data extrapolation process in which the transaction data is transformed into a generic data object, which is agnostic to data formats of the computing systems associated with the brokers 102 or partners 104, which further improves the processing speed and capabilities of the real-time messaging system 108. Also, because the generic data object is agnostic to the data formats of the computing systems of the brokers 102 or partners 104, the real-time messaging system 108 may be more adaptable to updates and modifications made to technical standards for data messaging formats.

When the transaction data 120 is transmitted to the message recipient, the data stored in the associated generic data object may be mapped to a data format compatible with the computing systems for the message recipient, such as the partners 104. In some implementations, the participants may handle and manipulate data in a format that is compatible with a predetermined technical standard, such as an Association for Cooperative Operations Research and Development (ACORD) Web Services Profile (AWSP) technical standard. However, in some examples, the participants exchanging the message containing the transaction data may use different AWSP versions or one or more of the participants may not use an AWSP data format for processes that involve processing or manipulation of transaction data. Because the transaction data is mapped from the agnostic generic data object format to the data format compatible with the message recipient, the data mapping process may be standardized based on the data format associated with the message recipient rather than having to perform different types of data transformations for each message that is sent based on the data formats of both the message sender and the message recipient, which reduces the number of processing layers and improves transmission efficiency. In addition, the real-time messaging system 108 may also attach any additional supporting documents (e.g., client information, spreadsheets, etc.) by inserting the supporting documents into a simple object access protocol (SOAP) envelope for the message prior to transmission. In addition, transforming the transaction data into the generic data object prior to mapping the data to a format compatible with the message recipient may ease the processing burden on the real-time messaging system 108, which may allow messages to be more easily transmitted to the recipients in real-time rather than being processed in batches one or more times per day.

In some examples, once a message including transaction data is sent to the message recipient, the real-time messaging system 108 may monitor data traffic transmitted by the recipient for a reply to the message, which may also be referred to as an inbound action. Inbound actions may include various types of reply messages including quotation messages from carriers, which may include accepted or declined quotation messages, or authorized line messages, which may include declined offer or conditional line messages. When a reply message is received, the real-time messaging system 108 unpacks or recovers the data in the message by performing a reverse data extrapolation process. The recovered or extracted data may be used to update the transaction data 120, and the status of the message may be updated in the queuing data 118 of the message.

In some examples, the participants in the real-time messaging environment 100 may include brokers 102, partners 104, and external entities 106. Brokers 102, in some embodiments, include a number of computing devices and databases distributed across a widely-dispersed network that may be distributed across a large, international geographic area. The broker network can be separate and independent from any network associated with any other participant in the real-time messaging environment 100, such as partners 104. In addition, the data handled and stored by the brokers 102 may be in a different format than the data handled and stored by the other participants of in the real-time messaging environment 100. In some implementations, the broker network may be divided into multiple regional networks (e.g., AMERICAS, EMEA, APAC, etc.) that manage interactions between the brokers 102 located in specific geographic regions that may have dedicated processing and network resources located within the specific region. In addition, each regional network may maintain a regional messaging queue. The brokers 102 can include, in some examples, insurance or reinsurance brokers. The brokers 102 may access the real-time messaging system 108 via computing devices 158 that are connected to the system 108 via any type of wired or wireless network. In some examples, the brokers 102 may manage transmitted and received messages for various types of transactions via a web portal interface that receives commands to transmit messages from the brokers 102 as well as provides an interface for a status of transmitted messages and received messages.

Partners 104, in some embodiments, include a number of computing devices and databases distributed across a widely-dispersed network that may be distributed across a large, international geographic area. The partner network can be separate and independent from any network associated with any other participant in the real-time messaging environment 100, such as the brokers 102. In addition, the data handled and stored by the partners 104 may be in a different format than the data handled and stored by the other participants of in the real-time messaging environment 100. The partners 104 can include, in some examples, insurance/reinsurance carriers and/or other clients of the brokers 102. The partners 104 may access the real-time messaging system 108 via computing devices 158 that are connected to the system 108 via any type of wired or wireless network. In some examples, the partners 104 may manage transmitted and received messages for various types of transactions via a web portal interface. In other implementations, the partners 104 may transmit and receive messages with the brokers 102 via other types of interfaces such as email or SMS messages.

In some implementations, external entities 106 may optionally be included as participants in the real-time messaging environment 100 and may include a number of computing devices and databases distributed across a widely-dispersed network that may be distributed across a large, international geographic area. The external entity network can be separate and independent from any network associated with any other participant in the real-time messaging environment 100, such as the brokers 102 or partners 104. In addition, the data handled and stored by the external entities 106 may be in a different format than the data handled and stored by the other participants of in the real-time messaging environment 100. The external entities 106 can include any type of external computing system, which may be associated with the brokers 102, that performs other functions than those associated with interacting with the real-time messaging system 108. For example, the external entities 106 may include other types of insurance-related systems such as risk or catastrophic event management systems. The external entities 106 may connect to the real-time messaging system 108 via computing devices 158 that are connected to the system 108 via any type of wired or wireless network. In some embodiments, external entities 106 may supply data into the real-time messaging system 108 (e.g., on a periodic basis or responsive to occurrence of a particular event or type of transaction). In some embodiments, the real-time messaging system 108 connects to one or more external entities 106 to request or poll for information. For example, the real-time messaging system 108 may be a subscriber of information supplied by one or more of the external entities 106, and the real-time messaging system 108 may log into one or more of the external entities 106 to access information.

The real-time messaging system 108 includes one or more engines or modules that perform processes associated with managing messaging interactions between participants in the real-time messaging environment 100. References to the engines or modules throughout the disclosure are meant to refer to software processes executed by circuitry of one or more processing circuits, which can also be referred to interchangeably as processing circuitry. In one example, a user management engine 130 includes one or more processes associated with providing an interface to interact with the brokers 102, partners 104, and external entities 106 within the real-time messaging environment 100. The processes performed by the engines of the real-time messaging system 108 can be executed in real-time in order to provide an immediate response to a system input. In addition, the processes can also be performed automatically in response to a process trigger that can include the reception of data from a data repository, a participant, or another processing engine. For example, the user management engine 130 can control connection and access to the real-time messaging system 108 by the brokers 102, partners 104, and/or external entities 106 via authentication interfaces at one or more external devices 158 of the brokers 102, partners 104, and/or external entities 106.

In addition, the real-time messaging system 108, in some embodiments, includes a data management engine 132 that organizes the transaction data received by the real-time messaging system 108 and also controls data handling during execution of the processes associated with queuing transaction data to be sent, transforming transaction data into various types of data formats, and managing the transmission and reception of messages between the brokers 102 and partners 104. In some implementations, the data management engine 132 processes the transaction data received from the brokers 102 associated with an invoice, quote, claim, or other type of transaction, and loads the transaction data 120 into the data repository 110. In some implementations, the data management engine 132 may also manage incoming reply or acknowledgement messages transmitted to the brokers 102 by the partners 104 in response to receiving invoicing messages or other types of messages associated with the transaction data.

In some implementations, the data management engine 132 also controls the interaction of the real-time messaging system 108 with a data repository 110 associated with the real-time messaging environment 100 and can also access any of the data from the data repository 110 for use by the real-time messaging system 108. For example, data generated during the execution of one or more processes by real-time messaging system 108 can be stored in data repository 110, and the data management engine 132 may control the flow of data between the data repository 110 and the real-time messaging system 108.

The real-time messaging system 108, in some embodiments, also includes a queue management engine 134 that controls the storage of queuing data 118 associated with a particular set of received transaction data and the updating of the queuing data 118 in response to receiving a reply or acknowledgement message from the partners 104. In some examples, the queue management engine 134 may also control the forwarding of data from one or more of the regional message queues for a group of brokers 102 within a particular geographic region to a global message queue. In addition, the queue management engine 134 may extract the identification information from the incoming transaction data that is maintained in the regional or global message queue. For example, the queue management engine 134 may extract only a portion of the data associated with a particular transaction to be stored as queuing data 118, which improves processing speed of the real-time messaging system 108. In some embodiments, queuing data 118 for a particular transaction may include the identification information for the transaction along with a current status of the transaction, which can be stored in a quick look-up table that can be referenced by the other processing engines of the real-time messaging system 108. In some implementations, the queue management engine 134 may flag a message for prioritized transmission when predetermined status criteria are met. For example, if the message has been in the queue with a particular status for more than a threshold amount of time, then the queue management engine 134 may flag the message for prioritized transmission or retransmission (e.g., such as after a failed message transmission or lack of acknowledgement by a message recipient), which may indicate to the message transmission engine 140 that the flagged message should be prioritized for transmission or retransmission before other messages in the queue.

For example, FIG. 2 illustrates an exemplary diagram of data fields for queuing data 200 that is stored in the regional and/or global message queue for a message associated with a particular transaction. In some implementations, the queuing data 200 may include an outgoing message queue identification (ID) 202, a date time stamp 204 indicating when the queuing data 200 for the message was last updated, a unique identifier for the transaction 206, a party responsible for a most recent update to the message 208, a receiving partner for the message 210, a current message status 212, an envelope number 214 for a SOAP envelope in which additional supporting documents are inserted, a message number 216, a message sent date 218, a message data format ID 220 indicating the message format of the message recipient, a reporting flag 222 indicating that the status of the message has been reported to the message originator, a date added 224 indicating when the queuing data 200 for the message was added to the queue, and a message queue identification 226.

Referring back to FIG. 1, in some implementations, the queue management engine 134 may also execute one or more queue triage actions when a current message status indicates that an error may have occurred with respect to a message that is maintained in a regional or global message queue. In some examples, the queue triage actions may include outputting notifications to various types of system users, adding the message to a separate triage queue with a message error status that is maintained by backend system support staff, or causing initiation or re-initiation of programmatic computing processes (e.g., rebooting servers, re-executing one or more sections of software code) based on the type of error that may have occurred. In other examples, the one or more queue triage actions may be performed by a message triage system or processing system that is separate from the queue management engine 134.

In one example, if a particular message has remained in a global or regional queue without being transmitted to a message recipient by the message transmission engine 140 for greater than one hour, then the current message status may be updated to reflect the delayed transmission. In response to the update of the current message status, the queue management engine 134 may also output a notification (e.g., SMS text message, email message) to one or more information technology (IT) support staff members to indicate that no action has been taken with respect to transmitting the message for more than an hour. Similarly, if the current message status is updated to reflect that a message has remained in a message queue for longer than a day without being transmitted, then the queue management engine 134 may output a notification to members of a business unit associated with the message. In addition, to outputting the notifications, the queue management engine 134 may also update the triage queue with the updated status.

In some implementations, failures to transmit messages that are stored in one or more queues may occur due to errors in software code execution and/or hardware malfunctions during code execution. In one example, the current message status and/or message error status in the triage queue may indicate one or more lines of code associated with the message error and/or hardware components (e.g., servers) that were in use when the message error occurred or was detected. In some embodiments, the queue management engine 134 may automatically initiate one or more programmatic troubleshooting solutions by outputting control signals to its own processing resources or processing resources of other processing engines to initiate or re-initiate one or more portions of software code execution, which may include rebooting one or more pieces of hardware. Once the automatic programmatic troubleshooting solutions have been executed, the queue management engine 134 may update the current message status to indicate whether or not the programmatic troubleshooting solutions were successful, and based on the success or failure, additional programmatic solutions may be executed or additional notifications may be transmitted to additional parties.

The real-time messaging system 108, in some embodiments, also includes a data extrapolation engine 136 that executes one or more processes associated with transforming the incoming transaction data from the brokers 102 into a generic data object that is agnostic to data formats associated with any of the participants in the real-time messaging environment 100. In some implementations, the data extrapolation engine 136 collects and builds the information that may be required to be in the message that is transmitted in a format compatible with the computing systems of the partners 104. In one example, the transaction data 120 includes the generic data object for each processed transaction. In addition, the generic data object may include at least those fields stored with the queuing data and may also include additional data fields that are used to map the generic data object into a predetermined format, such as a version of the AWSP data format. In some examples, the data extrapolation engine 136 may access a generic data object template 112 from the data repository 110. In addition, the generic data object template 112 may be updated based on modifications that are made to one or more versions of a standardized data format, such as the AWSP data format.

In some examples, the real-time messaging system 108 may include a data mapping engine 138 that maps the transaction data stored within the generic data object into a predetermined format compatible with the internal computing systems of the message recipient, such as the partners 104. In some implementations, the participants in the real-time messaging environment 100 may handle and manipulate data in a format that is compatible with a predetermined technical standard, such as a version of the AWSP technical standard. However, in some examples, the participants exchanging the message containing the transaction data may use different AWSP versions or one or more of the participants may not use an AWSP data format for processes that involve processing or manipulation of transaction data.

In some implementations, the data mapping engine 138 maps the generic data object to the predetermined message format based on message format data 114 associated with the message recipient and/or type of message or transaction along with corresponding mapping rules 116 stored in the data repository 110 that indicate how to map the generic data object to the predetermined message format for the message recipient. Because the transaction data is mapped from the agnostic generic data object format to the data format compatible with the message recipient, the data mapping process may be standardized based on the data format associated with the message recipient rather than having to perform different types of data transformations for each message that is sent based on the data formats of both the message sender and the message recipient. Storing the transaction data for a message as a generic data object reduces the number of processing layers needed to convert the message to a format that is compatible with a message recipient because a processing layer that is configured to recognize whether or not a message needs to be transformed to a format compatible with the message recipient is not required.

For example, FIG. 3 illustrates an exemplary diagram of data fields for a predetermined message format 300 that may be stored as message format data 114 in the data repository 110. In some examples, the data fields illustrated in FIG. 3 may represent a portion of a total number of data fields of the predetermined message format 300 that is transmitted to the message recipients. In some examples, the predetermined message format 300 may include data fields in one or more categories (356-366) that are associated with various types of messages and/or transactions. Based on the type of message and transaction being sent to the message recipient, the data mapping engine 138 may identify the data field categories to include in the predetermined message format 300.

In some implementations, a general information category 356 may include data fields indicating an invoice ID 302, an outgoing message queue ID 304, a reinsurer ID 306, a transaction ID 308, and a date time stamp 354. In some implementations, data entries in the general information category 356 correspond to at least a portion of the queuing data 118 (FIG. 1). An account information category 358 may include data fields for a total number of account items in a settlement group 310, an account period end date 312, an account period start date 314, an account reference currency 316, an account transaction date 318, and an account transaction description 320. An adjustment category 360 may include data fields for an adjustment premium due by the sender or receiver 322, an adjustment premium due to the sender or receiver 324, an adjustment sliding share amount 326, and a balance due amount 328. A broker information category 362 may include data fields for a broker account transaction 330, a brokerage percentage 332, a brokerage receiver share amount 334, and broker contact information 336. A cash loss category 364 may include data fields for a cash loss advance amount 338, a cash loss refund amount 340, and a commission percentage 342. A contract information category 366 may include data fields for a contract name 344, a contract period end date/time 346, a contract period start date/time 348, current payment expenses for contract receiver 350, and total current payment losses and expenses for contract receiver 352.

Referring back to FIG. 1, in some embodiments, the real-time messaging system 108 also includes a message transmission engine 140 that controls the transmission of messages from the brokers 102 to the partners 104. In other examples, the message transmission engine 140 may also control the transmission of messages from the partners 104 to the brokers 102. In some implementations, the message transmission engine 140 transmits messages based on information associated with those messages stored in the regional and/or global queues. In some examples, the information associated with the message queues is stored as queuing data 118 in the data repository 110. In some implementations, the message transmission engine 140 may function as a front-end processing engine of the real-time messaging system 108 and may operate asynchronously from the other processing engines of the system 108. For example, the rates at which transaction data 120 is received from the brokers 102, transformed into the generic data object, mapped to the predetermined message format, and transmitted to the message recipients may all be different. Because the processing engines of the real-time messaging system 108 operate asynchronously, the need for batch processing of multiple messages at predetermined times may be eliminated, which allows for real-time processing of transaction data and transmission of messages to the message recipients.

The message transmission engine 140 may transmit the messages in the queue to the one or more message recipients based on predetermined criteria that may include type of message, amount of time in queue, message recipient, processing capabilities of the message transmission engine 140, and/or whether the message has been flagged for prioritized transmission or transmission by the queue management engine 134. For example, messages transmitted to a particular message recipient may be prioritized over other recipients. In another example, messages may be transmitted on a first-in, first-out basis. In addition, the message transmission engine 140 may transmit multiple messages to multiple recipients in parallel based on processing capabilities of the computing resources of the message transmission engine 140.

In some implementations, prior to transmitting the messages to the message recipients, the message transmission engine 140 may also attach any additional supporting documents (e.g., client information, spreadsheets, etc.) by inserting the supporting documents into a SOAP envelope for the message prior to transmission. The additional supporting documents may be stored as a portion of the transaction data 120 in the data repository 110.

In certain embodiments, the real-time messaging system 108 may also include an inbound action management engine 142. In some examples, once a message including transaction data is sent to the message recipient by the message transmission engine 140, the inbound action management engine 142 may monitor data traffic transmitted by the recipient for an inbound action reply. Inbound actions may include various types of reply messages including quotation messages from carriers, which may include accepted or declined quotation messages, or authorized line messages, which may include declined offer or conditional line messages. When a reply message is received, the inbound action management engine 142 unpacks or recovers the data in the message by performing a reverse data extrapolation process. The recovered data may be used to update the transaction data 120, and the status of the message may be updated in the queuing data 118 of the message. In addition, in response to receiving the inbound action and updating the transaction data 120, the inbound action management engine 142 may cause a notification to be presented to the brokers 102 via a user interface at the web portal or via an email or text message to the broker 102.

The real-time messaging environment 100, as noted earlier, may also include the data repository 110. The data repository 110 may be connected to the real-time messaging system 108 via a wired or wireless network. In some implementations, the data repository 110 stores the generic data object templates 112, message format data 114, mapping rules 116, queuing data 118, and transaction data 120, and any other type of data associated with executing the processes of the real-time messaging system 108.

Figure 4:
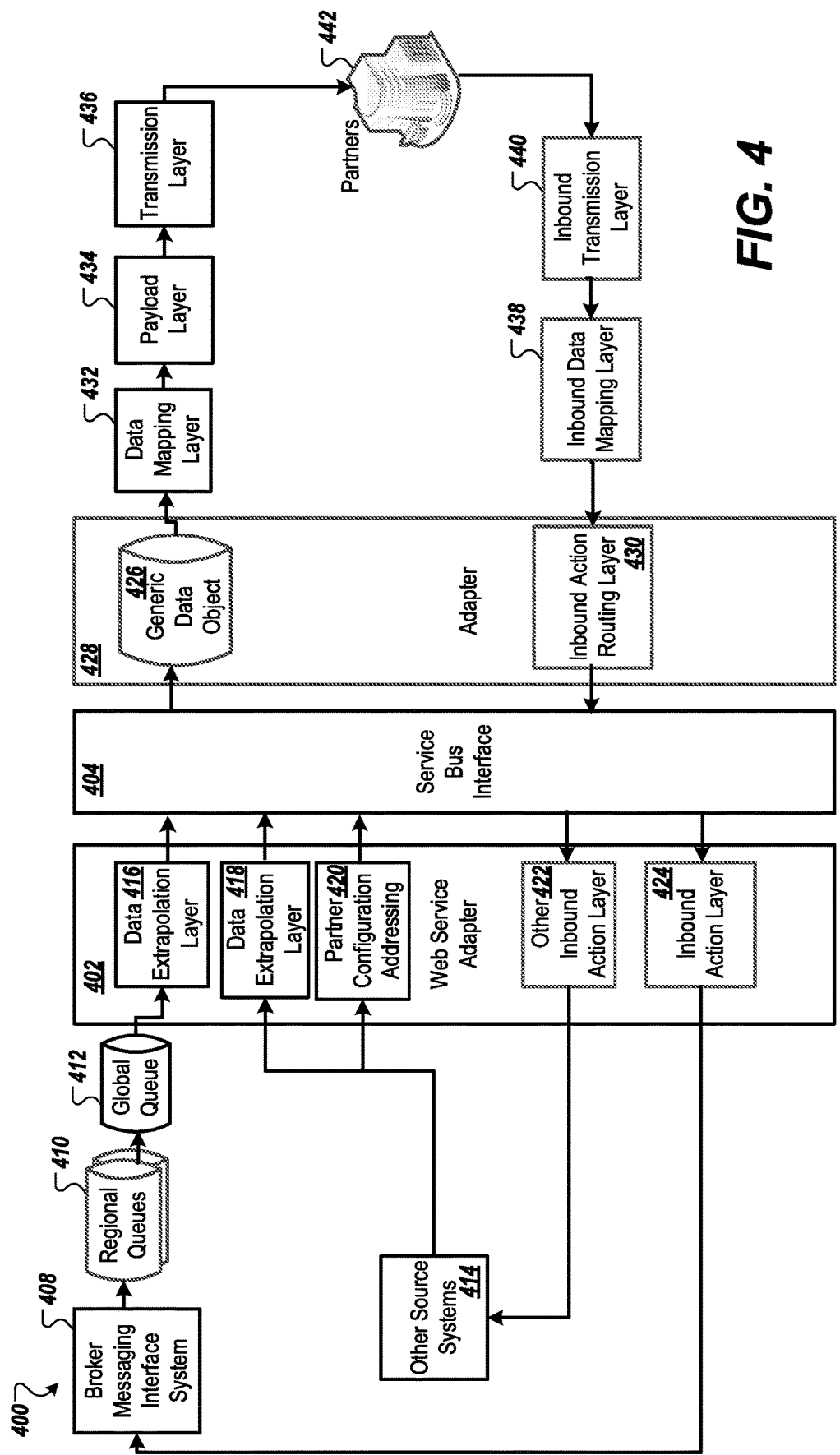
FIG. 4 illustrates an exemplary diagram of a computing architecture for a real-time messaging system.

Turning to FIG. 4, an exemplary diagram of a computing architecture for real-time messaging system 400 is illustrated, which is an implementation of the real-time messaging system 108 (FIG. 1). The computing architecture for the system 400 may include multiple types of computing resources that interact with one another to efficiently generate and transmit messages between participants in the real-time messaging environment 100 that include insurance or reinsurance transaction data. In some examples, the computing resources of the real-time messaging system 400 may include combinations of cloud-based and non-cloud-based computing resources.

In some implementations, the architecture for the system real-time messaging system 400 may include at least one broker messaging interface system 408, which may be distributed across multiple computing devices in multiple geographic regions (e.g., AMERICAS, EMEA, APAC). The brokers 102 may access the broker messaging interface system 408 via a software application suite loaded on the computing devices. The brokers 102 may interact with the broker messaging interface system 408 via user interfaces to initiate message transmissions to the partners 104 as well as monitor the status of the transmissions through status lookup and/or notification features. The queuing data 118 associated with the transactions for the messages initiated at the broker messaging interface system 408 may be transmitted to regional queues 410 associated with the geographic region. The queuing data 118 at each of the regional queues 410 may be forwarded to a global queue 412 to be managed in a centralized queuing structure. In some examples, the regional queues 410 and global queue 412 may share and exchange computing resources with one another.

In some examples, the computing architecture for the system 400 may also integrate other source systems 414, which may be associated with the brokers 102 and may perform other functions than those associated with interacting with the real-time messaging system 400. For example, the other source systems 414 may include other types of insurance-related systems such as risk or catastrophic event management systems. In some examples, data provided by the other source systems 414 may be used instead of or in addition to the transaction data provided by the broker messaging interface system 408 to generate the messages that are transmitted to the message recipients. The other source systems 414 may correspond to the external entities 106 of the real-time messaging system 108 (FIG. 1).

In some examples, the global queue 412 for the broker messaging interface system 408 and the other source systems 414 may interface with a web service adapter 402, which may be configured to transform the transaction data for a message into a generic data object in preparation for transmitting the message to a partner 442. For example, the web service adapter 402 may include data extrapolation layers 416, 418 for each of the broker messaging interface system 408 and other source systems 414 that transform the transaction data for a message into a generic data object. The web service adapter 402 may also include computing resources devoted to a partner configuration addressing layer 420 for the other source systems 414, which allows data provided by the other source systems 414 to be associated with a particular partner 442 or other message recipient. The transformed data generated at the data extrapolation layers 416, 418 and/or partner configuration addressing layer 420 are forwarded across a service bus interface 404 to an adapter 428 that facilitates transferring data to the computing systems of the partners 442. In some examples, the adapter 428 may be a software component executed on one or more messaging servers or other computing resources of the system 400 that allows messages to be received into or transmitted out of the computing systems of the partners 442 and may be compatible with many types of messaging formats including SMTP, POP3, FTP, or Microsoft Message Queuing (MSMQ) formats. In some aspects, generic data objects 426 may be stored at the adapter 428 in preparation for configuring and transmitting the messages to the partners 442.

In some implementations, the system 400 may include a data mapping layer 432 that maps the transaction data stored within the generic data object into a predetermined format compatible with the internal computing systems of the message recipient, such as the partners 442, which may be a version of the AWSP technical standard. In some implementations, the data mapping layer 432 maps the generic data object to the predetermined message format based on message format data associated with the message recipient and/or type of message or transaction along with corresponding mapping rules that indicate how to map the generic data object to the predetermined message format for the message recipient.

At payload layer 434, any supporting documents (e.g., client information, spreadsheets, etc.) may be attached to the message by inserting the supporting documents into a SOAP envelope for the message prior to transmission. In some examples, at transmission layer 436, a transmission protocol (e.g., HTTP, HTTPS, FTP, SFTP, etc.) for the message may be identified, and the message is transmitted to a designated message recipient of the partners 442.

In some examples, once a message including transaction data is sent to the message recipient by the transmission layer 436, an inbound transmission layer 440 may monitor data traffic transmitted by the partners 442 for an inbound action reply. Inbound actions may include various types of reply messages including quotation messages from carriers, which may include accepted or declined quotation messages, or authorized line messages, which may include declined offer or conditional line messages. When a reply message is received at the inbound transmission layer 440, the message is forwarded to an inbound data mapping layer 438, which unpacks or recovers the data in the message by performing a reverse data extrapolation process. The recovered data may be forwarded to the broker messaging interface system 408 and/or other source systems 414 through an inbound action routing layer 430 at the adapter 428, the service bus interface 404, and inbound action layers 422, 424 at the web service adapter 402. The recovered data may be used to update the transaction data, and the status of the message may be updated in the queuing data of the message at the regional and/or global queues 410, 412. In addition, a notification to be presented to the brokers 102 via a user interface at the web portal or via an email or text message to the broker 102 at the broker messaging interface system 408.

Figure 5:
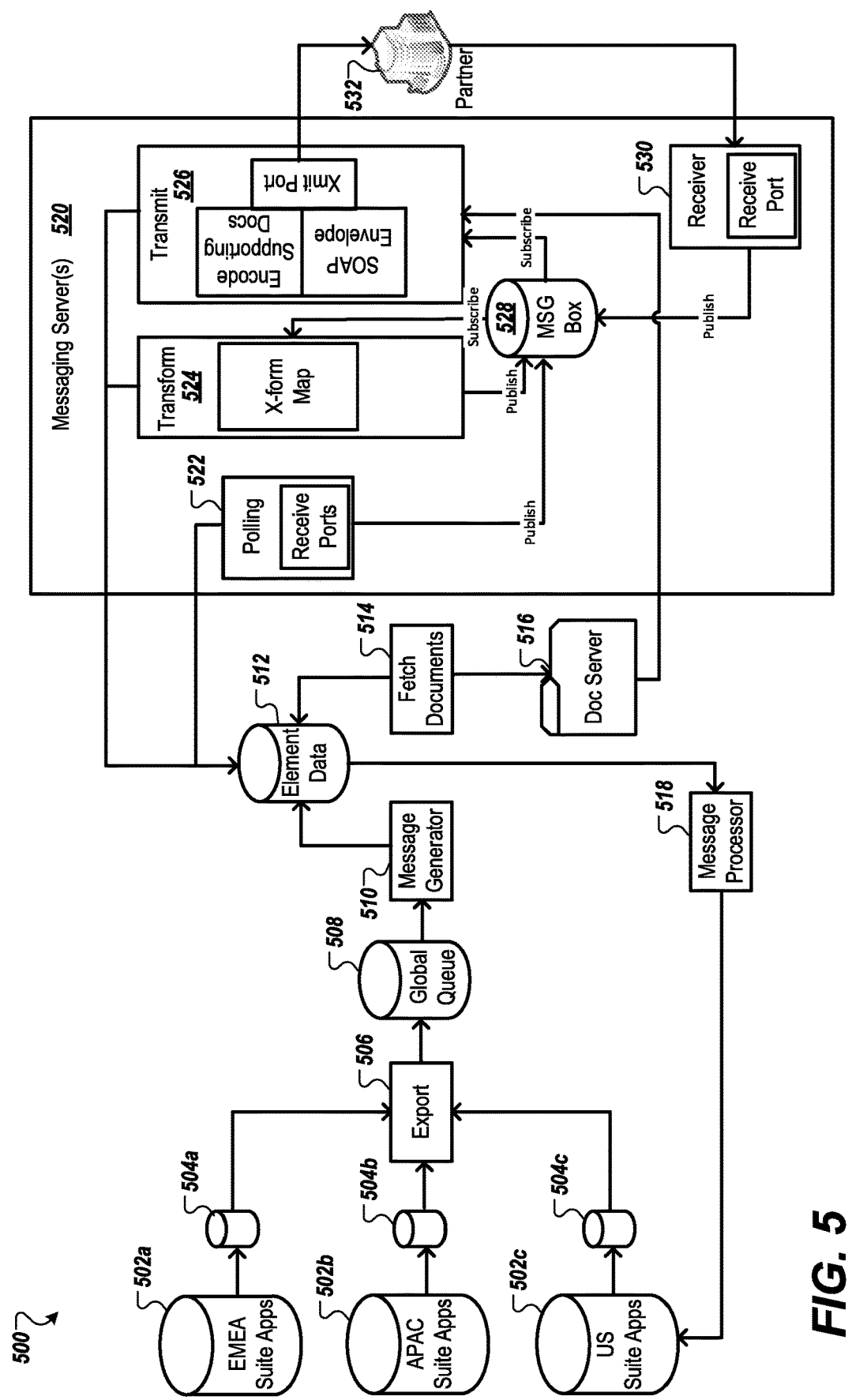
FIG. 5 illustrates an exemplary diagram of a computing architecture for a real-time messaging system.

Turning to FIG. 5, another implementation of a computing architecture for a real-time messaging system 500 is illustrated, which is an implementation of the real-time messaging system 108 (FIG. 1). In some examples, the real-time messaging system 500 may include suite applications 502 distributed across multiple geographic regional networks (e.g., EMEA, APAC, AMERICAS) that allow the brokers 102 to interact with the system 500 through a web portal interface or a direct messaging service to initiate message requests to partners 532, view reply messages from the partners 532, and monitor a status of previously sent messages. The suite applications 502 may communicate with distributed message queues 504 associated with each of the geographic regions. In some examples, the queueing data for the messages maintained in the regional queues may be forwarded to a regionally distributed or centralized export server 506 that forwards the queuing data to a global queue 508, where the queuing data for all of the regions may be maintained. In some examples, the queuing data and other transaction data for a message selected for transmission may be forwarded by a message generator server 510 to element data storage database 512, from which computing resources of messaging servers 520 access transaction and queuing data for the messages being exchanged between participants interacting with the real-time messaging system 500. In addition, a document fetching server 514, may extract supporting documents for the messages transmitted to the partners, which may be stored in document server 516 in preparation for attaching the supporting documents to a message prior to transmission. In addition, a message processing server 518 may forward reply message data added to the element data storage database 512 back to the suite applications 502, which may also be updated in the regional and global queues 504, 508.

In some examples, the messaging servers 520 for the real-time messaging system 500 may include multiple computing resources, such as cloud-based or non-cloud-based servers, adapters, or databases that perform various functions associated with transmitting and/or receiving messages between brokers interacting with the suite applications 502 and partners 532. In some implementations, the messaging servers 520 may be associated with an inter-organizational middleware system (IOMS) that allow the participants interacting with the real-time messaging system 500 to automate messaging processes. For example, the messaging servers 520 may include a polling server 522 that includes one or more receive ports configured to access transaction data for a message from the element data storage database 512 and forward the transaction data to a message box 528, which may provide localized data storage resources for the messaging servers 520.

In some implementations, the messaging servers 520 may also include transformation servers 524 that transform the transaction data for messages into generic data objects and also map the generic data objects into message formats compatible with the internal computing systems of the partners 532. In addition, transmission servers 526 may configure messages to be sent to the partners 532, which may include encoding supporting documents for the messages, inserting the supporting documents into a SOAP envelope for the messages, and transmitting the messages to the partners 532 via a transmission port. In some implementations, the messaging servers 520 may also include message receiving servers 530 that receive reply messages from the partners 532, which may be forwarded to message box 528 in preparation for forwarding to the global queue 508 to update the status of the transmitted messages.

Figure 6:
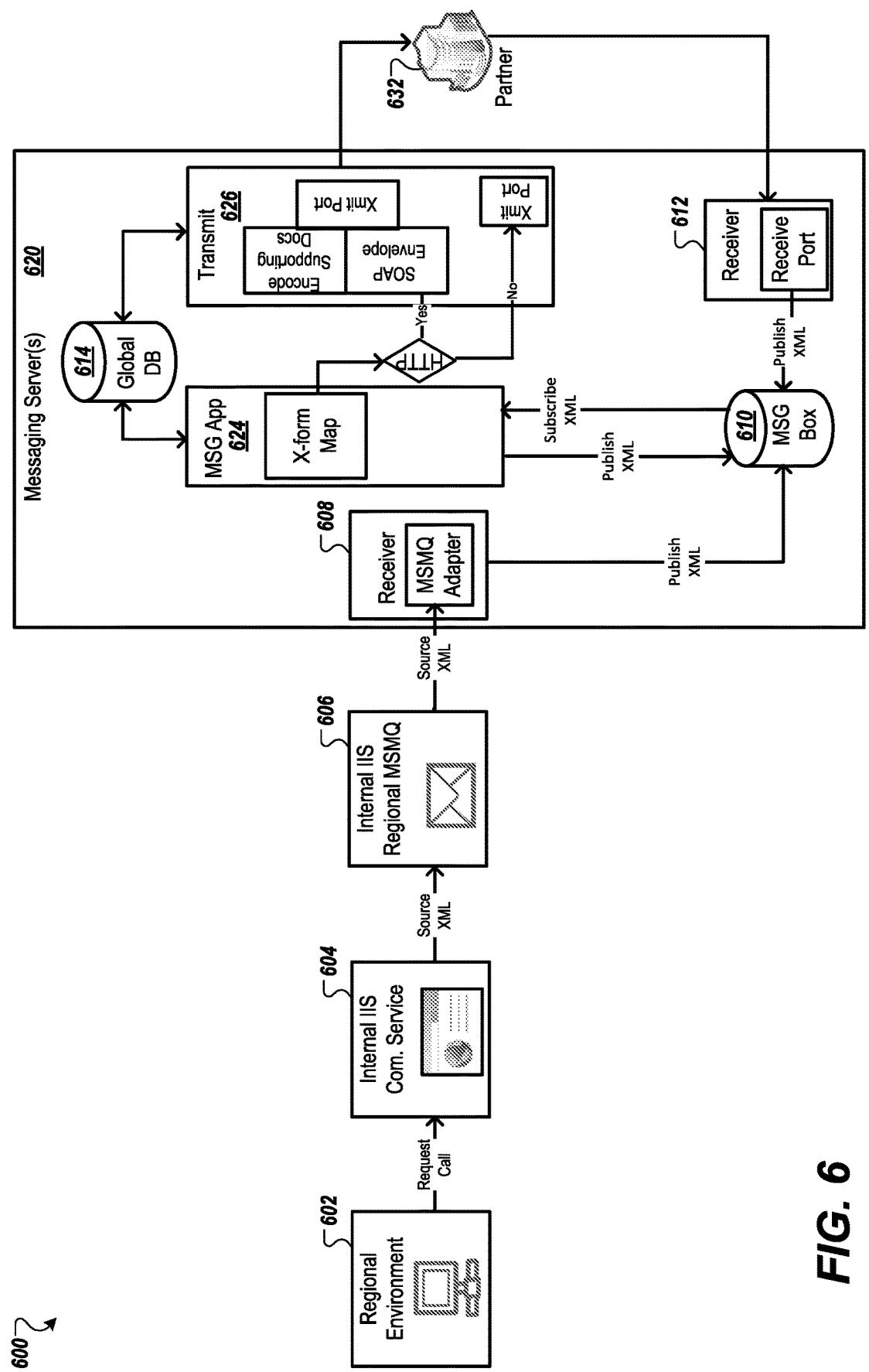
FIG. 6 illustrates an exemplary diagram of a computing architecture for a real-time messaging system.

Turning to FIG. 6, an implementation of an application-based computing architecture for a real-time messaging system 600 is illustrated, which is an application-based implementation of the real-time messaging system 500 (FIG. 5). In some examples, the real-time messaging system 600 may include regional computing environments 602 distributed across multiple geographic regional networks (e.g., EMEA, APAC, AMERICAS) that allow the brokers 102 to interact with the system 600 through a web portal interface or a direct messaging service to initiate message requests to partners 632, view reply messages from the partners 632, and monitor a status of previously sent messages. Message requests initiated at the regional computing environments 602 are transmitted via request call to a regionally-based internal internet information server (IIS) communication service 604, such as Windows Communication Foundation (WCF) service that provides a framework for sending and/or receiving asynchronous messages from one service endpoint to another. In some examples, the transaction data associated with the message requests may be forwarded from the regional internal IIS communication service 604 to an internal IIS message queuing system 606, such as Microsoft Message Queuing (MSMQ), which allows applications running on separate servers or processors to communicate.

In some examples, from the internal IIS message queuing system 606, the transaction data for the messages is transmitted to receiving ports 608 at messaging servers 620 for each of the regional environments, which each may include a MSMQ adapter. In some examples, the messaging servers 620 for the real-time messaging system 600 may include multiple computing resources, such as cloud-based or non-cloud-based servers, adapters, or databases that perform various functions associated with transmitting and/or receiving messages between brokers interacting with the computing systems of the regional environments 602 and partners 632. In some implementations, the messaging servers 620 may be associated with an IOMS that allows the participants interacting with the real-time messaging system 600 to automate messaging processes. In some implementations, the receiving ports 608 forward the transaction data to a message box 610, which may provide localized data storage resources for the messaging servers 620. The message box 610 may interface with the receiving ports 608, receiving ports 612 that receive reply messages from the partners 632, as well as message application servers 624 and message transmission servers 626 that configure messages for transmission to the partners 632.

In some implementations, the messaging servers 620 may also include message application servers 624 that transform the transaction data for messages into generic data objects and also map the generic data objects into message formats compatible with the internal computing systems of the partners 632. In addition, transmission servers 626 may configure messages to be sent to the partners 632, which may include encoding supporting documents for the messages, inserting the supporting documents into a SOAP envelope for the messages, and transmitting the messages to the partners 632 via a transmission port. In some examples, information may be shared between the message application servers 624 and the transmission servers 626 via a global database 614. In some implementations, the messaging servers 620 may also include message receiving servers 612 that receive reply messages from the partners 632, which may be forwarded to message box 610.

Figure 7:
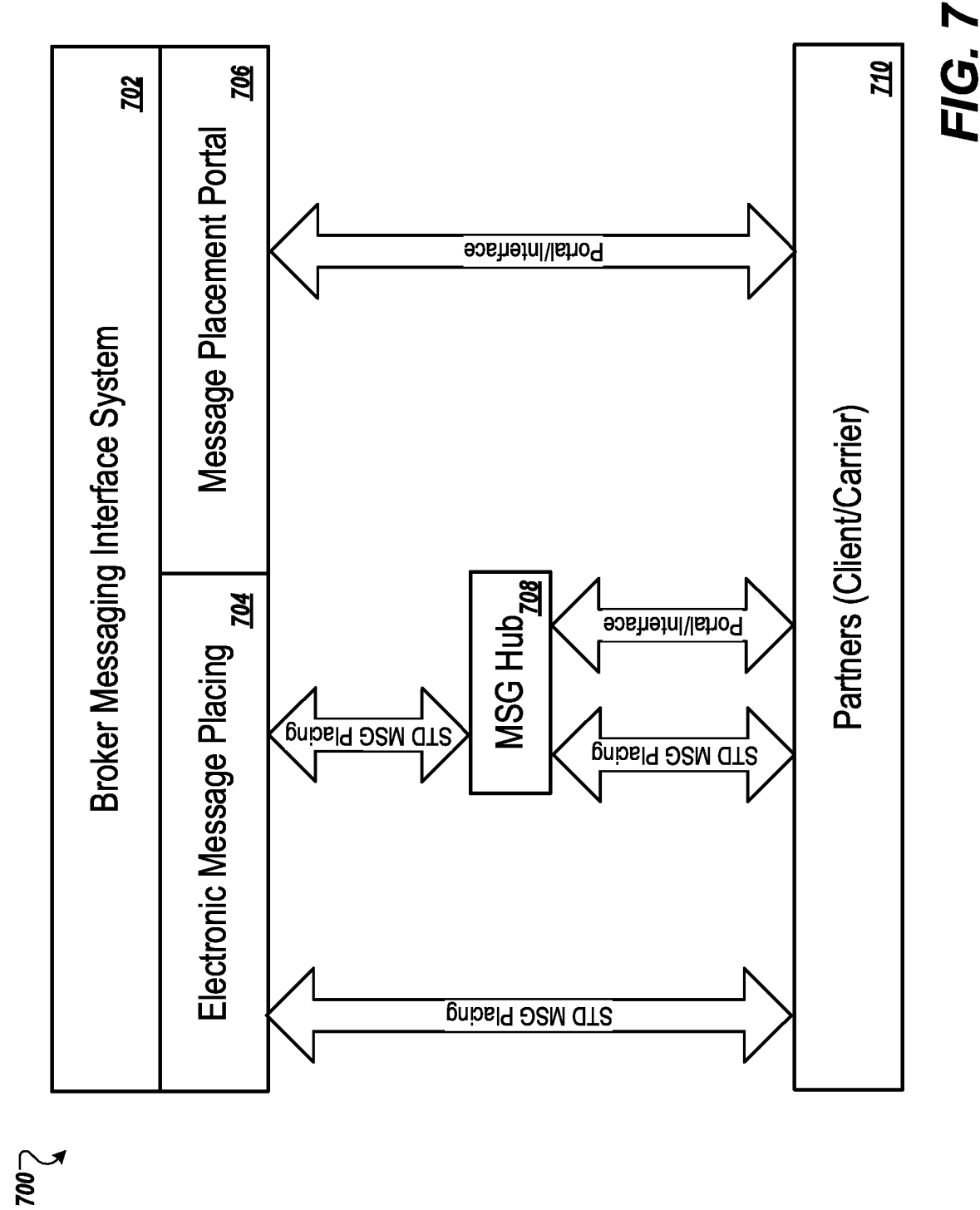
FIG. 7 illustrates an exemplary diagram of messaging interfaces between participants in the real-time messaging environment.

FIG. 7 illustrates an exemplary diagram of messaging interfaces 700 between participants in the real-time messaging environment 100. In some implementations, the brokers 102 interact with the real-time messaging system 108 via a broker messaging interface system 702, which provides the ability to initiate messages to partners 710 (e.g., carriers/clients) associated with various types of insurance or reinsurance transactions. In some examples, the broker messaging interface system 702 may provide a direct electronic message placing application and interface 704 that may be configured to directly transmit or receive messages from the partners 710 in a standard message placing format (e.g., AWSP). In addition, the broker messaging interface system 702 may also provide a message placement portal 706 that may allow the brokers to access and interact with the broker messaging interface system 702 via a web portal. In some examples, at the message placement portal 706, brokers may generate message transmissions associated with various types of transactions, view statuses of transmitted messages, and view any messages received from the partners 710. In some examples, the broker messaging interface system 702 may transmit the messages to an intermediate message hub 708 accessible by the partners 710, such as an eBIX PPL hub, which also provide direct message transmission/reception as well as web portal access.

Figure 8:
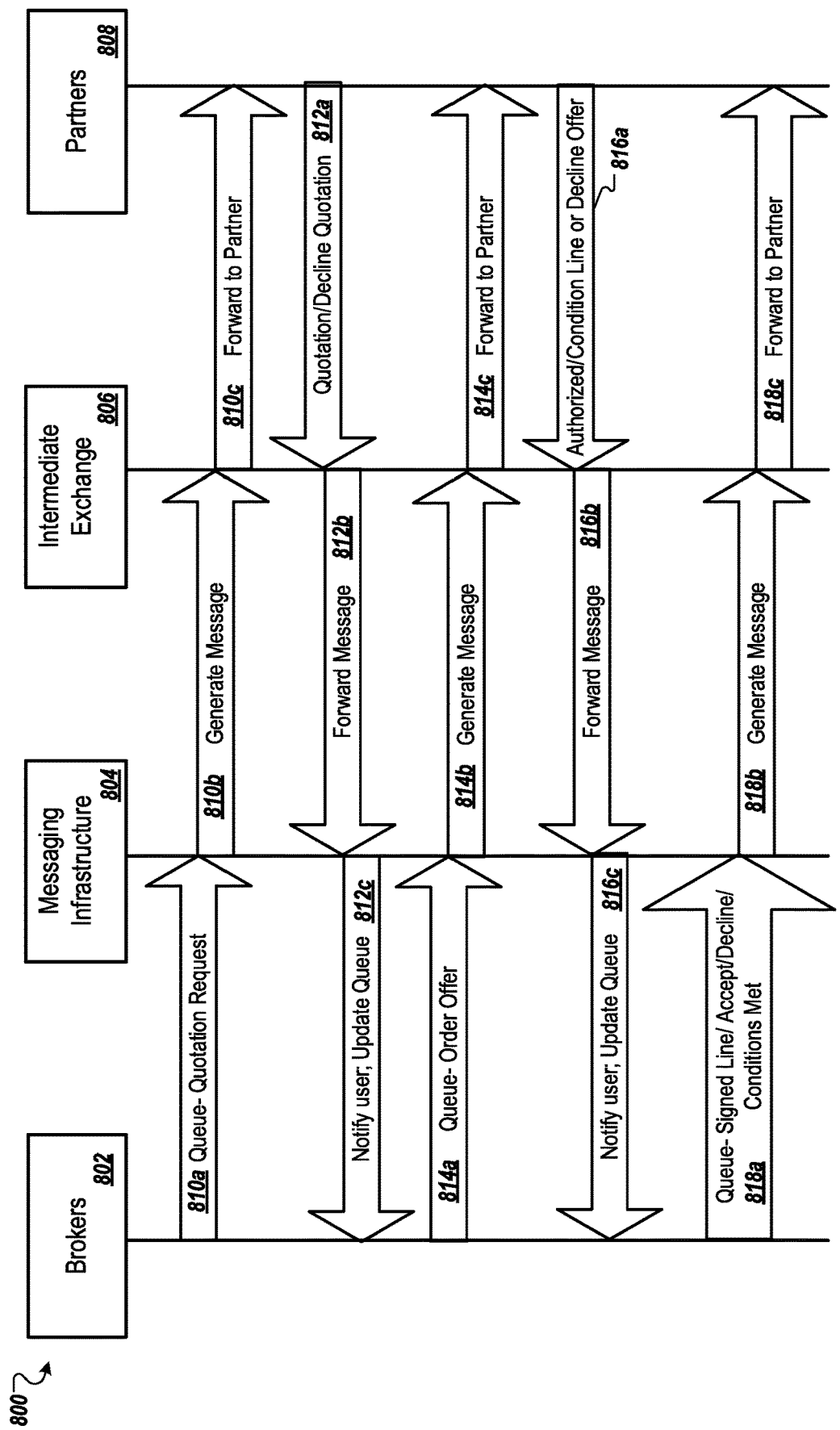
FIG. 8 illustrates an exemplary diagram of messages exchanged between participants in a real-time messaging environment.

FIG. 8 illustrates an exemplary swim lane diagram 800 of messages exchanged between participants in the real-time messaging environment 100. As shown in the diagram 800, in some examples, messages may be initiated by brokers 802, such as at a broker messaging interface system, which allows the brokers to interact with the real-time messaging system 108 via computing devices 158 (FIG. 1), and may be configured into a format compatible with an intermediate exchange hub 806 and/or a message recipient (e.g., partners 808) at a messaging infrastructure 804 (e.g., the processing engines of the real-time messaging system 108 shown in FIG. 1) of the broker messaging interface system according to the implementations described above. For example, queuing data for messages initiated by the brokers 802 at a web portal or direct messaging interface may be added to a regional and/or global queue at the messaging infrastructure 804 by the queue management engine 134, transaction data associated with the messages may be transformed into a generic data object by the data extrapolation engine 136, which may be further mapped to a format compatible with the internal computing systems of the intermediate exchange hub 806 and/or partners 808 by the data mapping engine 138 prior to transmission of the messages to the message recipients (e.g., partners 808) by the message transmission engine 140. Similarly, data in reply messages received from the partners 808 may be unpacked and communicated to the brokers 802 by the inbound action management engine 142.

In some implementations, messages generated by the messaging infrastructure 804 (e.g., messages 810b, 814b, 818b) by the processing engines of the real-time messaging system 108 (e.g., queue management engine 134, data extrapolation engine 136, and data mapping engine 138) in response to receiving a message initiation trigger from the brokers 802 (e.g., queue events 810a, 814a, 818a) may be transmitted to the intermediate exchange hub 806 prior to being forwarded to the partners 808 (messages 810c, 814c, 818c) by the message transmission engine 140 of the real-time messaging system 108. In some examples, the partners 808 may access the messages at a portal user interface of the intermediate exchange hub 806. In other examples, the messages 810b, 814b, 818b generated by the messaging infrastructure 804 may be transmitted directly to the partners 808 without being intermediately received by the intermediate exchange hub 806.

In some examples, reply messages initiated by the partners 808 (e.g., messages 812a, 816a) in response to receiving the messages 810b, 814b, 818b from the brokers 802 may be received by the intermediate exchange hub 806 prior to being transmitted to or accessed by the brokers 802 via the messaging infrastructure 804. The intermediate exchange hub 806 may in turn forward the reply messages (e.g., messages 812b, 816b) to the messaging infrastructure 804 of the real-time messaging system 108. In addition, the messaging infrastructure 804 may include an inbound action routing layer, such as the inbound action management engine 142 of the real-time messaging system 108, that transforms the reply messages into a format compatible with the internal computing systems of the brokers 802 and/or updates the message queue to reflect an updated status of the previously transmitted messages 810b, 814b, 818b. In some examples, the brokers 802 may access the reply messages at a portal user interface of the intermediate exchange hub 806. In other examples, the reply messages 812a, 816a initiated by the partners 808 may be transmitted directly to the messaging infrastructure 804 without being intermediately received by the intermediate exchange hub 806 and may also be accessed by the brokers 802 at a portal user interface of the messaging infrastructure 804 or may be forwarded directly to the brokers 802 through another type of messaging interface (e.g., email, SMS) by the messaging infrastructure 804.

In the illustrative examples of FIG. 8, the brokers 802 initiate an insurance quotation request 810a, which is transmitted to the messaging infrastructure 804 as a queue event message that includes transaction data associated with the quotation request. In response to receiving the queue event message 810a, the messaging infrastructure 804 (e.g., queue management engine 134, data extrapolation engine 136, and data mapping engine 138) generates a message 810b that is sent to the partners 808 either directly or via the intermediate exchange hub 806. If the message 810b is sent to the intermediate exchange hub 806, then the intermediate exchange hub 806 may transmit a forwarding message 810c to the partners 808. In response to receiving the forwarded quotation request message 810c, the partners 808 may initiate a reply message 812a in which the partners 808 may either provide a quotation to the brokers 802 or reject the quotation request. The reply message 812a may be transmitted directly to the messaging infrastructure 804 of the real-time messaging system 108 or to the intermediate exchange hub 806. If the message 812a is sent to the intermediate exchange hub 806, then the intermediate exchange hub 806 may transmit a forwarding message 812b to the messaging infrastructure 804. In some examples, the messaging infrastructure 804 (e.g., inbound action management engine 142) may update the queuing data with the information in the reply message as well as provide a notification message 812c to the brokers 802 either via a direct message or via a user interface at a portal that a reply to the quotation request 810a has been received.

In response to receiving the notification message 812c that may include an insurance/reinsurance quotation from the partners 808, the brokers 802 may initiate an order offer queue event message 814a, which is transmitted to the messaging infrastructure 804 and includes transaction data associated with the order offer. In response to receiving the queue event message 814a, the messaging infrastructure 804 (e.g., queue management engine 134, data extrapolation engine 136, and data mapping engine 138) generates a message 814b that is sent to the partners 808 either directly or via the intermediate exchange hub 806. If the message 814b is sent to the intermediate exchange hub 806, then the intermediate exchange hub 806 may transmit a forwarding message 814c to the partners 808. In response to receiving the forwarded order offer message 814c, the partners 808 may initiate a reply message 816a in which the partners 808 may either provide an authorized line, a conditional line, or decline the offer submitted by the brokers 802. The reply message 816a may be transmitted directly to the messaging infrastructure 804 of the real-time messaging system 108 or to the intermediate exchange hub 806. If the message 816a is sent to the intermediate exchange hub 806, then the intermediate exchange hub 806 may transmit a forwarding message 816b to the messaging infrastructure 804. In some examples, the messaging infrastructure 804 (e.g., inbound action management engine 142) may update the queuing data with the information in the reply message as well as provide a notification message 816c to the brokers 802 either via a direct message or via a user interface at a portal that a reply to the order offer 814a has been received.

In response to receiving the notification message 816c that may include an authorized/conditional line or declined offer from the partners 808, the brokers 802 may initiate a signed line queue event message 818a including either an acceptance or rejection of the conditional line and/or an acknowledgement that offer conditions have been met, which is transmitted to the messaging infrastructure 804 and includes transaction data associated with the order offer. In response to receiving the queue event message 818a, the messaging infrastructure 804 (e.g., queue management engine 134, data extrapolation engine 136, and data mapping engine 138) generates a message 818b that is sent to the partners 808 either directly or via the intermediate exchange hub 806. If the message 818b is sent to the intermediate exchange hub 806, then the intermediate exchange hub 806 may transmit a forwarding message 818c to the partners 808.

Figure 9:
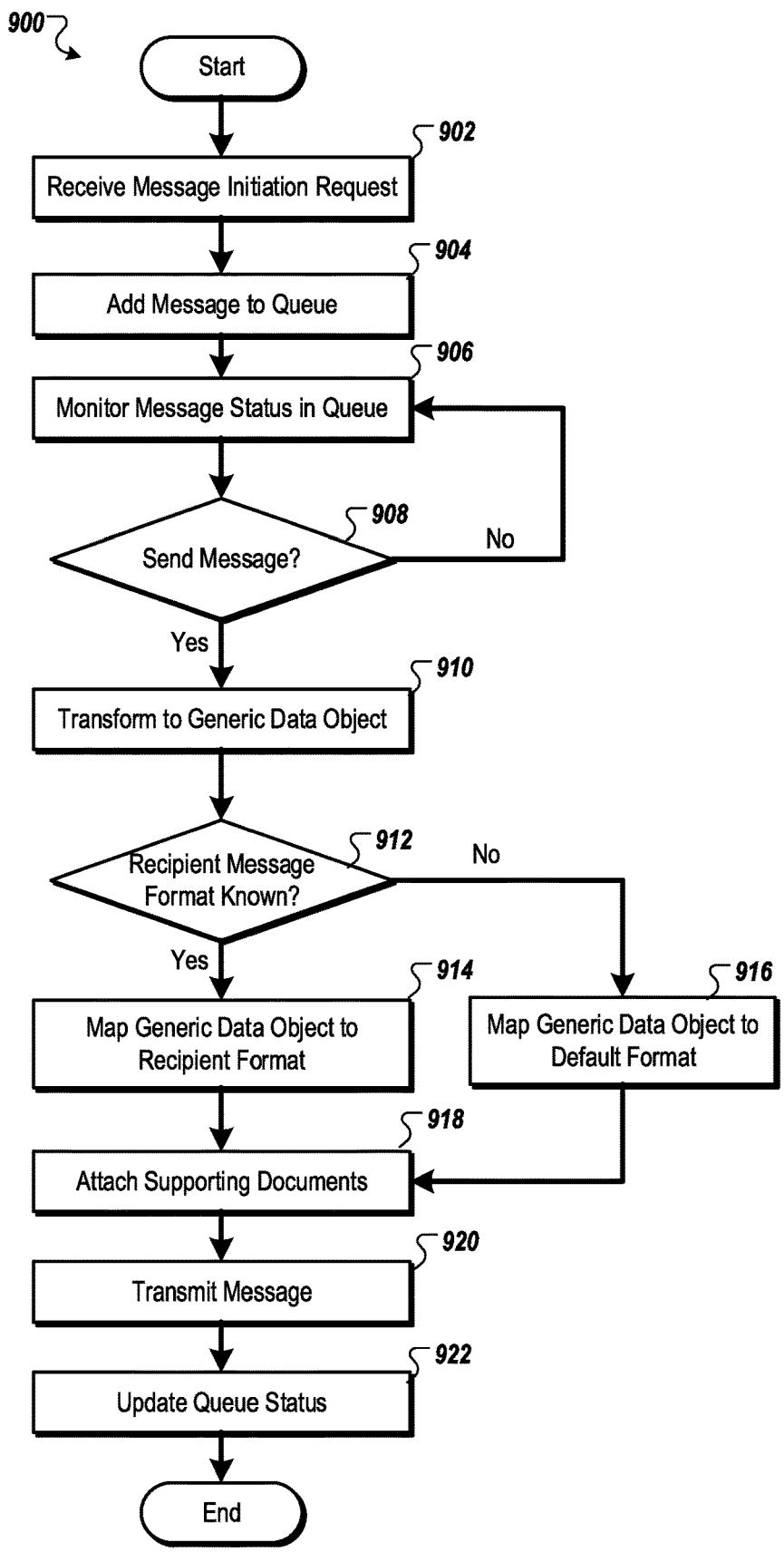
FIG. 9 illustrates a flow chart for a method of message transmission.
Figure 10:
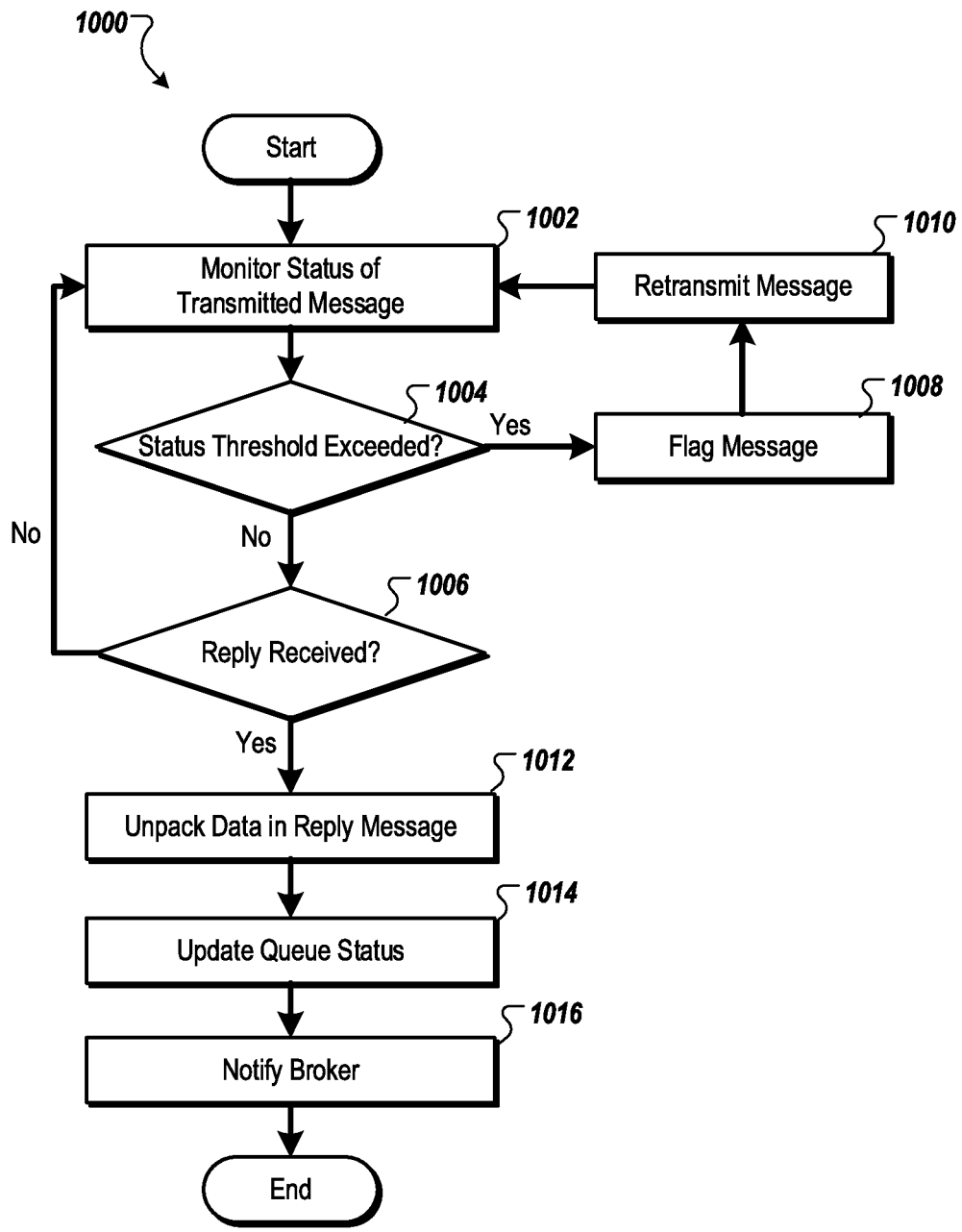
FIG. 10 illustrates a flow chart for a method of message reception.

FIGS. 9-10 illustrate exemplary flow charts of methods for performing message transmission and reception by a real-time messaging system such as the real-time messaging system 108 (FIG. 1). Turning to FIG. 9, a flow chart for a method 900 of transmitting messages is illustrated. In certain embodiments, the method commences when a participant in the real-time messaging environment, such as brokers in an insurance or reinsurance transaction, initiates a message transmission request (902) for a transaction to be sent to partners at a user interface for a web portal that allows the brokers to interact with the real-time messaging system. In some examples, the message transmission initiation request can be associated with various types of insurance or reinsurance transactions such as order requests, order offers, or signed line offers. In response to receiving the message initiation request, in some examples, queuing data for the message is added to a regional and/or global message queue (904). The queuing data for a particular message may include identification information for the transaction along with a current status of the transaction, which can be stored in a quick look-up table that can be referenced by processing engines of the real-time messaging system.

In some examples, a current status of the messages stored in the global queue may be monitored (906) when determining a prioritized order in which to configure and transmit the messages to the message recipients. For example, the message transmission engine 140 of the real time messaging system 108 (FIG. 1) may prioritize messages transmitted to a particular message recipient over messages that are transmitted to other recipients. In another example, messages may be transmitted on a first-in, first-out basis. In addition, the message transmission engine 140 may transmit multiple messages simultaneously to multiple recipients in parallel based on processing capabilities of the computing resources of the real-time messaging system. In some examples, messages may also be flagged for prioritized transmission if predetermined criteria are met, such as when the message has remained in the queue for greater than a threshold amount of time without being transmitted.

In some implementations, if the message in the queue is selected for transmission to the message recipient (908), then transaction data for the message may be transformed into a generic data object (910), which may be agnostic to a messaging data format used by either the message originator (e.g., brokers 102) or the message recipient (e.g., partners 104). If the messaging data format associated with the message recipient is known (912), then in some examples, the generic data object for the message is mapped to messaging data format for the message recipient (914). For example, in the real-time messaging system 108, the messaging data format may be known if the message format is stored as message format data 114 in the data repository 110 and may be unknown if the message format is not included in the message format data 114. If the messaging data format associated with the message recipient is unknown, then in some examples, the generic data object for the message may be mapped to a default messaging format (916). In some implementations, additional supporting documents (e.g., client information, spreadsheets, etc.) may be attached to the message (918) by inserting the supporting documents into a SOAP envelope for the message prior to transmission. In some examples, a transmission protocol (e.g., HTTP, HTTPS, FTP, SFTP, etc.) for the message may be identified, and the message is transmitted to a designated message recipient (920), and the current status for the message may be updated in the message queue (922), according to some examples.

Turning to FIG. 10, a flow chart for a method 1000 of receiving messages is illustrated. In certain embodiments, the method 1000 may commence when a message is transmitted from the brokers to the partners in an insurance or reinsurance transaction, and the current status of the message may be updated in the message queue. In some examples, the real-time messaging system may continue to monitor the status of the message in the message queue (1002). In some examples, if the message has been in the queue with a particular status for more than a threshold amount of time (1004), such as a transmitted message with no reply from the partners, then the message may be flagged for prioritized transmission or retransmission (1008), which may indicate that the flagged message may be prioritized for transmission or retransmission before other messages in the queue, and in some examples, the message may be transmitted or retransmitted (1010). In the example of the real-time messaging system 108 (FIG. 1), the prioritized transmission or retransmission of the message may be performed by the message transmission engine 140.

In some implementations, if it is determined that a reply message associated with a message in the queue has been received (1006), then in some examples, the reply message may be recovered by unpacking transaction data in the reply message in a reverse data extrapolation process (1012), and in some examples, the message queue may be updated to reflect that the reply message has been received (1014). In some implementations, the recovered data may be presented to the brokers via a user interface at the web portal or via an email or text message to the broker 102 (1016).

While the flow charts described with respect to FIGS. 9 and 10 illustrate an ordering of one or more blocks or steps, it can be understood that that steps can be performed in any order, in series, or in parallel. In addition, while the methods are described with respect to messages transmitted and received by brokers 102 in a real-time messaging environment, it can be understood that the processes described herein can also be applied to messages transmitted or received by other participants in the real-time messaging environment 100. In some implementations, multiple steps may be performed simultaneously by different processing engines. For example, notification of the broker regarding a reply message received from a partner (1016) may be executed simultaneously with updating the status of the message in the message queue (1014). In other examples, the notification of the broker 1016 may be performed prior to the updating of the message queue.

Figure 11:
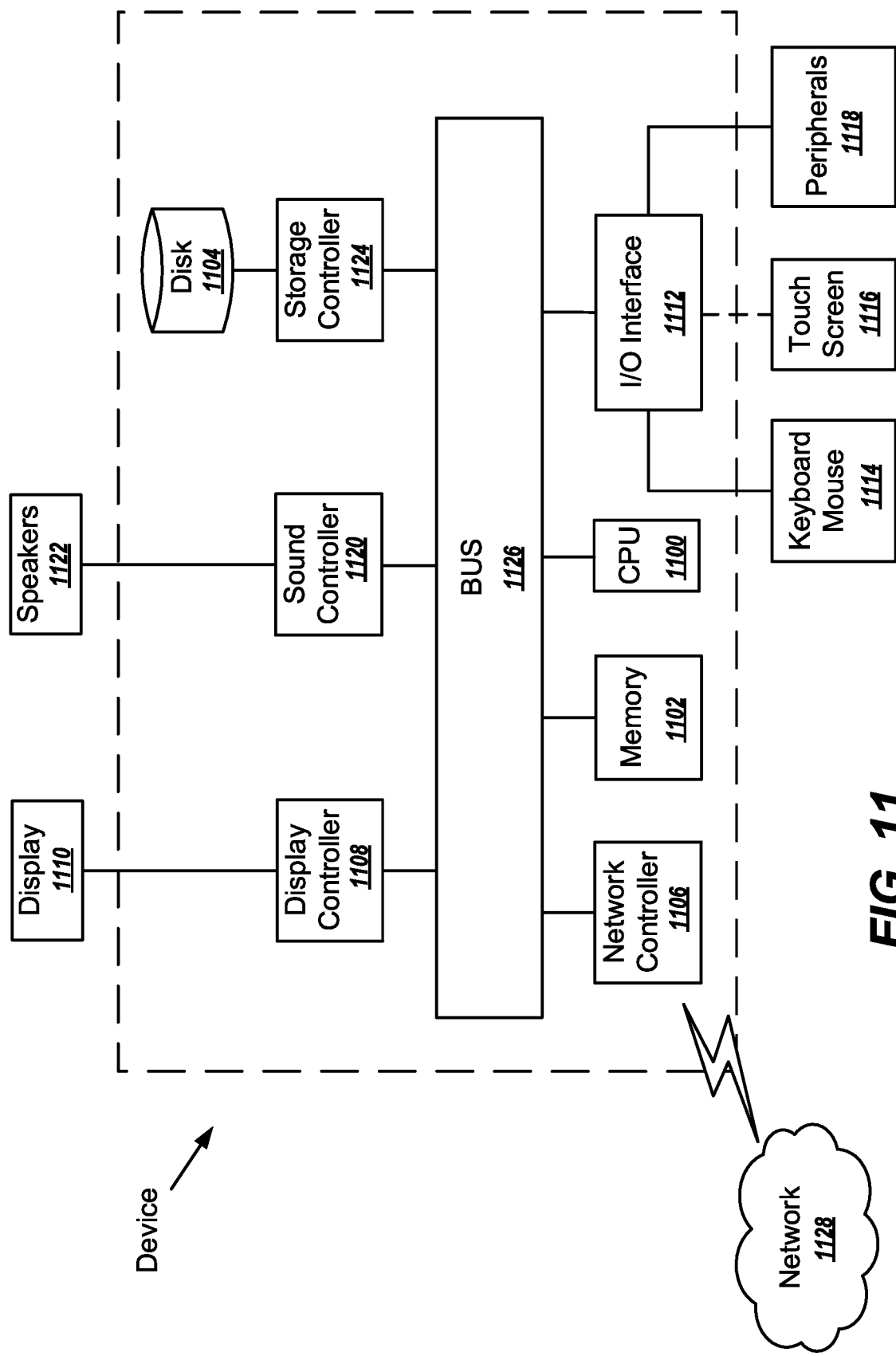
FIG. 11 is a block diagram of an example computing system.

Next, a hardware description of the computing device, mobile computing device, or server according to exemplary embodiments is described with reference to FIG. 11. In FIG. 11, the computing device, mobile computing device, or server includes a CPU 1100 which performs the processes described above. The process data and instructions may be stored in memory 1102. These processes and instructions may also be stored on a storage medium disk 1104 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device, mobile computing device, or server communicates, such as a server or computer.

Further, a portion of the claimed advancements may be provided as a utility application, background daemon, or component of an operating system, or combination thereof, executing in conjunction with CPU 1100 and an operating system such as Microsoft Windows 2, UNIX, Solaris, LINUX, Apple MAC-OS and other systems known to those skilled in the art.

CPU 1100 may be a Xenon or Core processor from Intel of America or an Opteron processor from AMD of America, or may be other processor types that would be recognized by one of ordinary skill in the art. Alternatively, the CPU 1100 may be implemented on an FPGA, ASIC, PLD or using discrete logic circuits, as one of ordinary skill in the art would recognize. Further, CPU 1100 may be implemented as multiple processors cooperatively working in parallel to perform the instructions of the inventive processes described above.

The computing device, mobile computing device, or server in FIG. 11 also includes a network controller 1106, such as an Intel Ethernet PRO network interface card from Intel Corporation of America, for interfacing with network 1128. As can be appreciated, the network 1128 can be a public network, such as the Internet, or a private network such as an LAN or WAN network, or any combination thereof and can also include PSTN or ISDN sub-networks. The network 1128 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The computing device, mobile computing device, or server further includes a display controller 1108, such as a NVIDIA GeForce GTX or Quadro graphics adaptor from NVIDIA Corporation of America for interfacing with display 1110, such as a Hewlett Packard HPL2445w LCD monitor. A general purpose I/O interface 1112 interfaces with a keyboard and/or mouse 1114 as well as a touch screen panel 1116 on or separate from display 1110. General purpose I/O interface also connects to a variety of peripherals 1118 including printers and scanners, such as an Office Jet or Desk Jet from Hewlett Packard.

A sound controller 1120 is also provided in the computing device, mobile computing device, or server, such as Sound Blaster X-Fi Titanium from Creative, to interface with speakers/microphone 1122 thereby providing sounds and/or music.

The general purpose storage controller 1124 connects the storage medium disk 1104 with communication bus 1126, which may be an ISA, EISA, VESA, PCI, or similar, for interconnecting all of the components of the computing device, mobile computing device, or server. A description of the general features and functionality of the display 1110, keyboard and/or mouse 1114, as well as the display controller 1108, storage controller 1124, network controller 1106, sound controller 1120, and general purpose I/O interface 1112 is omitted herein for brevity as these features are known.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 12:
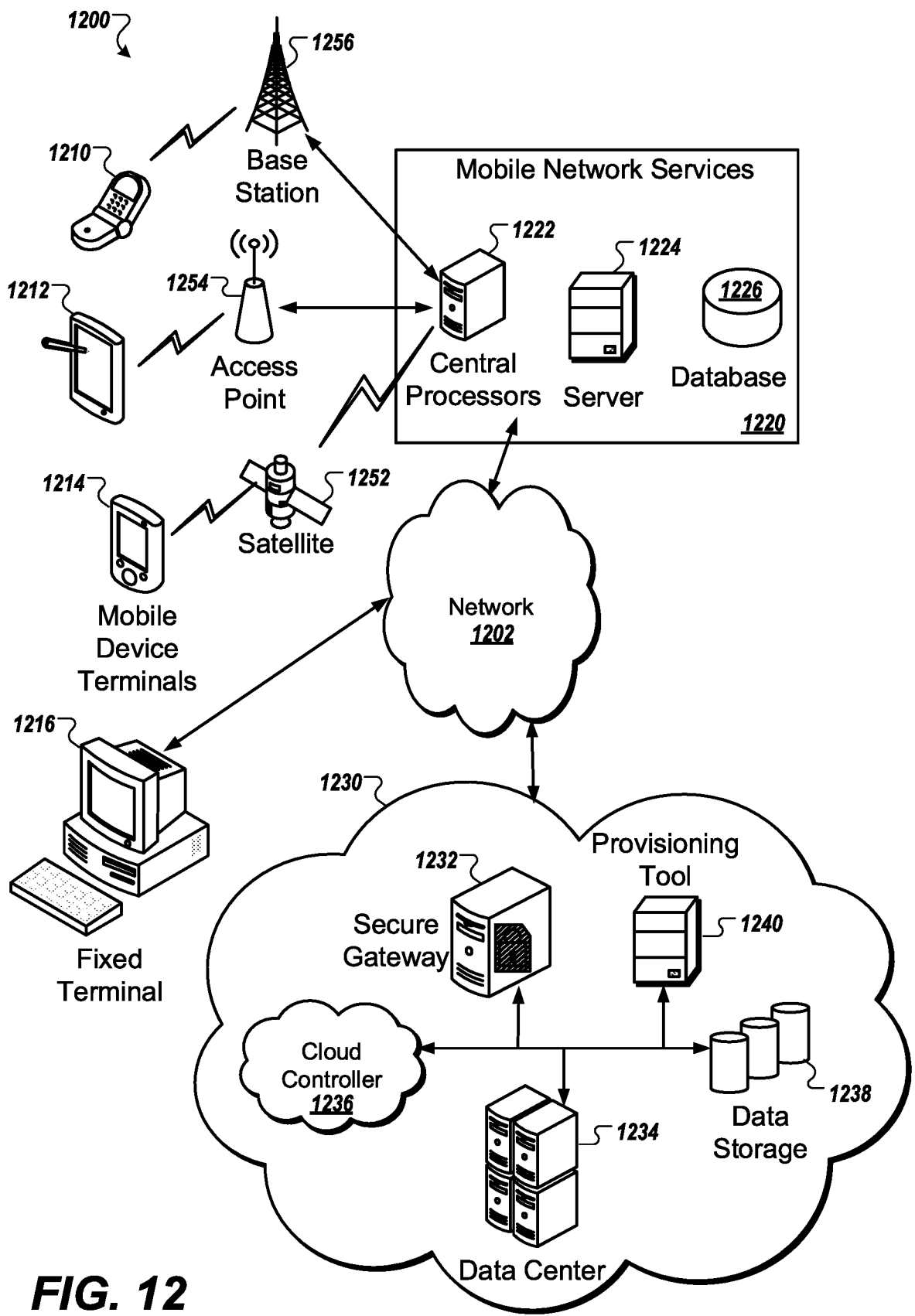
FIG. 12 is a block diagram of an example distributing computing environment including a cloud computing environment.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 12, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

In some implementations, the described herein may interface with a cloud computing environment 1230, such as Google Cloud Platform™ to perform at least portions of methods or algorithms detailed above. The processes associated with the methods described herein can be executed on a computation processor, such as the Google Compute Engine by data center 1234. The data center 1234, for example, can also include an application processor, such as the Google App Engine, that can be used as the interface with the systems described herein to receive data and output corresponding information. The cloud computing environment 1230 may also include one or more databases 1238 or other data storage, such as cloud storage and a query database. In some implementations, the cloud storage database 1238, such as the Google Cloud Storage, may store processed and unprocessed data supplied by systems described herein.

The systems described herein may communicate with the cloud computing environment 1230 through a secure gateway 1232. In some implementations, the secure gateway 1232 includes a database querying interface, such as the Google BigQuery platform.

The cloud computing environment 1230 may include a provisioning tool 1240 for resource management. The provisioning tool 1240 may be connected to the computing devices of a data center 1234 to facilitate the provision of computing resources of the data center 1234. The provisioning tool 1240 may receive a request for a computing resource via the secure gateway 1232 or a cloud controller 1236. The provisioning tool 1240 may facilitate a connection to a particular computing device of the data center 1234.

A network 1202 represents one or more networks, such as the Internet, connecting the cloud environment 1230 to a number of client devices such as, in some examples, a cellular telephone 1210, a tablet computer 1212, a mobile computing device 1214, and a desktop computing device 1216. The network 1202 can also communicate via wireless networks using a variety of mobile network services 1220 such as Wi-Fi, Bluetooth, cellular networks including EDGE, 3G and 4G wireless cellular systems, or any other wireless form of communication that is known. In some embodiments, the network 1202 is agnostic to local interfaces and networks associated with the client devices to allow for integration of the local interfaces and networks configured to perform the processes described herein.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A system for coordinating automated, real-time or near real-time exchange of messages between computing systems of a plurality of participants in a plurality of data sharing and updating sessions involving disparate data formats among participants, the system comprising:

a messaging interface computing system including one or more first servers having first processing circuitry and a first computer-readable memory storing computer-executable functions thereon that, when executed by the first processing circuitry of a first set of one or more servers, cause the first processing circuitry to receive, from a plurality of geographically distinct regionally-distributed computing devices, a plurality of message initiation requests including messaging data associated with the plurality of data sharing and updating sessions, store, in a global message queue for each of the plurality of message initiation requests, queuing data representing a portion of the messaging data for each of the respective message initiation request, wherein the queuing data represents message initiation requests from the plurality of regionally-distributed computing devices, and the queueing data stored in the global message queue comprises regional queueing data stored in regional queues at each of the plurality of regionally-distributed computing devices, and cause, at the plurality of regionally-distributed computing devices, updates to the respective regional queuing data indicating a status of each message initiation request associated with the respective regionally-distributed computing device based on a plurality of reply messages received from remote computing devices of one or more message recipients; and a message transmission computing system including one or more second servers having second processing circuitry and a second computer-readable memory storing computer-executable functions thereon that, when executed by the second processing circuitry of a second set of one or more servers, cause the second processing circuitry to transform the messaging data for each of the plurality of message initiation requests into a generic data object that is agnostic to messaging formats of a respective sending computing system of the plurality of regionally-distributed computing devices and a respective receiving computing system of the remote computing devices of the one or more message recipients, map each generic data object of each of the plurality of message initiation requests to a respective predetermined message format of a plurality of message formats, wherein the predetermined message format is associated with the respective receiving computing system, and for each data sharing and updating session of the plurality of data sharing and updating sessions, transmit, responsive to the queuing data for the respective data sharing and updating session being selected from the global message queue for transmission, the respective messaging data in the respective predetermined message format to the respective receiving computing system.

2. The system of claim 1, wherein the machine-executable instructions of the messaging interface computing system, when executed on the first processing circuitry, further cause the first processing circuitry to:

detect, by monitoring data traffic exchanged with the plurality of regionally-distributed computing devices, each of the plurality of reply messages received from the remote computing devices of the one or more message recipients.

3. The system of claim 2, wherein the machine-executable instructions of the messaging interface computing system, when executed on the first processing circuitry, further cause the first processing circuitry to:

update, at a regionally-distributed data store responsive to detecting each reply message of the plurality of reply messages, the respective messaging data to include information contained within the respective reply message.

4. The system of claim 1, wherein each of the message initiation requests comprises at least one of an order request, an order offer, or a signed line offer for an insurance or reinsurance transaction.

5. The system of claim 1, wherein each of the plurality of reply messages comprises at least one of i) a quotation message for an accepted or declined insurance quote, ii) an authorized line message, or iii) a conditional line message.

6. The system of claim 1, wherein the generic data object is an ACORD Web Services Profile (AWSP) data object.

7. The system of claim 1, wherein mapping the generic data object, by the second processing circuitry of the message transmission computing system, to the predetermined message format associated with the receiving computing system comprises inserting one or more supporting documents into an associated simple object access protocol (SOAP) envelope.

8. The system of claim 1, wherein the queuing data includes a time stamp indicating when a respective item of queuing data was last updated, an identifier for a respective transaction, a transmitting party, a receiving party, and a current message status.

9. The system of claim 1, wherein the message transmission computing system is configured to operate asynchronously from the message interface computing system.

10. The system of claim 1, wherein transmitting the messaging data, by the second processing circuitry of the message transmission computing system, comprises transmitting the messaging data in a first-in, first-out order.

11. The system of claim 1, wherein transmitting the messaging data, by the second processing circuitry of the message transmission computing system, comprises transmitting the messaging data in a priority order based on predetermined transmission criteria.

12. The system of claim 11, wherein the predetermined transmission criteria include at least one of a type of message, an amount of time spent in the global messaging queue, or a message recipient.

13. The system of claim 12, wherein the machine-executable instructions of the message transmission computing system, when executed on the second processing circuitry, further cause the second processing circuitry to:
flag the messaging data, responsive to the messaging data exceeding a predetermined period of time spent in the global messaging queue, for prioritized transmission to the receiving computing system.

14. The system of claim 12, wherein the machine-executable instructions of the message transmission computing system, when executed on the second processing circuitry, further cause the second processing circuitry to:
flag the messaging data, responsive to detecting a transmission failure for the messaging data, for prioritized retransmission to the receiving computing system.

15. The system of claim 14, wherein the machine-executable instructions of the message transmission computing system, when executed on the second processing circuitry, further cause the second processing circuitry to:
responsive to detecting a transmission failure for the messaging data, automatically initiate one or more programmatic troubleshooting solutions for the message transmission computing system; and
update, responsive to results of the one or more programmatic troubleshooting solutions, a current status for the messaging data in the global message queue.

16. The system of claim 1, wherein the generic data object comprises a plurality of fields, each field of the plurality of fields provided for storing information for a corresponding field of a set of fields of at least one messaging format of a plurality of messaging formats.

17. The system of claim 16, wherein mapping comprises transferring data from a portion of the plurality of data fields of the generic data object corresponding to the predetermined message format into a message of the predetermined message format.

18. A method for coordinating automated, real-time or near real-time exchange of messages between computing systems of a plurality of participants in a plurality of data sharing and updating sessions involving disparate data formats among participants, the method comprising:
receiving, from a plurality of geographically distinct regionally-distributed computing devices, a plurality of message initiation requests, each message initiation request including transaction data associated with a data exchange session between two or more parties in a negotiation;
for each message initiation request of the plurality of message initiation requests,
storing, by processing circuitry, queuing data in a global message queue, wherein the queueing data comprises
a transaction identifier identifying the transaction data for the respective message initiation request, and
regional queuing data stored in regional queues at each of the plurality of regionally-distributed computing devices, and
the queueing data represents message initiation requests from the plurality of regionally-distributed computing devices,
after storing the queueing data, transforming, by the processing circuitry, the transaction data into a generic data object that is agnostic to both a messaging format of a respective sending system of one or more sending computing systems and a message format of a respective receiving system of a plurality of receiving computing systems, wherein
the message format is one of a plurality of message formats corresponding to the plurality of receiving computing systems,
determining, by the processing circuitry, the message format of the respective receiving system, and
mapping, by the processing circuitry, the generic data object to the message format;
selecting, by the processing circuitry from the global messaging queue, a selected transaction identifier representing a particular message initiation request of the plurality of message initiation requests, wherein the selecting is based on prioritized transmission criteria;
transmitting, by the processing circuitry responsive to selecting the selected transaction identifier, the transaction data of the particular message initiation request to the respective receiving system in the respective message format of the respective receiving system; and
causing, by the processing circuitry at the plurality of regionally-distributed computing devices, updates to respective regional queuing data indicating a status of message initiation requests associated with the respective regionally-distributed computing device based on reply messages received from respective receiving computing systems.

19. The method of claim 18, wherein the prioritized transmission criteria include at least one of a type of message, an amount of time spent in the global messaging queue, a message recipient, or existence of a prioritized transmission flag.

20. The method of claim 19, further comprising:
flagging the queuing data of the selected transaction identifier, responsive to the queueing data exceeding a predetermined period of time spent in the global messaging queue, for prioritized transmission of the associated transaction data to the respective receiving system.

* * * * *